United States Patent
Shumate

(10) Patent No.: US 7,590,476 B2
(45) Date of Patent: Sep. 15, 2009

(54) VEHICLE DIAGNOSIS SYSTEM AND METHOD

(75) Inventor: Dwayne M. Shumate, Macomb, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/516,987

(22) Filed: Sep. 7, 2006

(65) Prior Publication Data

US 2008/0065288 A1 Mar. 13, 2008

(51) Int. Cl.
*G01M 17/00* (2006.01)
*G06F 7/00* (2006.01)

(52) U.S. Cl. ........................................................ 701/29

(58) Field of Classification Search .................... 701/33, 701/29, 31, 30, 35, 43, 101, 34; 340/825.52, 340/428, 425.5; 702/179–185; 700/28–34; 714/25, 26, 33, 30, 31, 36, 37, 40, 41
See application file for complete search history.

(56) References Cited

U.S. PATENT DOCUMENTS

| | | | | |
|---|---|---|---|---|
| 4,404,639 A | * | 9/1983 | McGuire et al. | 701/35 |
| 5,541,840 A | * | 7/1996 | Gurne et al. | 701/33 |
| 6,055,468 A | * | 4/2000 | Kaman et al. | 701/29 |
| 6,678,591 B2 | * | 1/2004 | Ohmura et al. | 701/29 |
| 7,209,815 B2 | * | 4/2007 | Grier et al. | 701/29 |
| 2002/0007237 A1 | * | 1/2002 | Phung et al. | 701/33 |
| 2002/0103583 A1 | * | 8/2002 | Ohmura et al. | 701/33 |

* cited by examiner

*Primary Examiner*—Khoi Tran
*Assistant Examiner*—Bhavesh V Amin
(74) *Attorney, Agent, or Firm*—Thomas N. Twomey

(57) ABSTRACT

A method of diagnosing a vehicle fault includes receiving information on a vehicle from a customer regarding an actual vehicle fault and accessing data regarding the actual vehicle fault from the vehicle. A diagnostic program is initiated based on identifying vehicle information, the information received from the customer, and the data accessed from the vehicle. A specific vehicle system is selected for diagnosis and includes a particular vehicle component that may be associated with the actual vehicle fault. A list of diagnostic program results is received that defines multiple probable vehicle component faults for the specific vehicle system that may be associated with the actual vehicle fault. A determination on how to proceed with correcting the actual vehicle fault is made based on the list of diagnostic program results that define multiple probable vehicle component faults. A probable vehicle component fault is selected to evaluate whether it is the source of the actual vehicle fault.

17 Claims, 5 Drawing Sheets

VEHICLE DIAGNOSIS SYSTEM AND METHOD

TECHNICAL FIELD

The present invention generally relates to a diagnostic aid and, more particularly to a diagnostics application that focuses on vehicle systems to provide a more accurate and comprehensive list to a user in determining a vehicle fault.

BACKGROUND OF THE INVENTION

In the automotive repair industry, diagnosing vehicle faults typically requires gathering information from a user related to the perceived fault. The repair technician then evaluates the information received and makes a determination as to what vehicle system(s) or component(s) of the vehicle assembly are causing the fault. This approach to vehicle diagnostics is symptom driven, meaning that the description of the fault is not analyzed based on the vehicle system, but instead is generally determined based on the perceived fault a customer provides. Accurate translation of the symptom to a vehicle system or component is critical for efficient and accurate diagnosis of problems. This becomes particularly important with respect to modern vehicles because of complex integrated vehicle electronic systems. In addition, it is often impractical to narrow down an excessively large list of possible symptoms to a smaller list of possible systems. Instead, the list of possible systems should be narrowed down because it is exceptionally smaller from the start.

To take the observed or described operational characteristics of a vehicle and accurately translate that information into a specific vehicle system is not always intuitive. For example, drivability symptoms (e.g., low power, poor performance, harsh shifting, slow starting, etc.) may be associated with multiple vehicle systems. Accordingly, an application that assists a user in translating a symptom to a system and to provide a reasonably accurate and comprehensive list of vehicle systems likely to be associated with the fault would prove useful, and would be an improvement in the art.

SUMMARY OF THE INVENTION

In one aspect of the present invention, a vehicle diagnosis system is provided for determining one or more vehicle faults. The system includes a data storage medium having a sortable list of probable component faults for vehicle systems of multiple vehicles organized by vehicle year, make and model. A diagnosis program is linked to the data storage medium that generates probable component faults from the sortable list based on a particular vehicle year, make and model. An interface having data fields is adapted to receive information from a user that relates to vehicle fault information, fault information provided by the vehicle, as well as year, make and model information. Data output includes probable component faults. The vehicle diagnosis system includes an assistance program that allows information entered by a user to be observed by a third party for the purpose of assisting the user to diagnose a particular vehicle fault. The vehicle diagnosis system includes a tracking program that updates the probability associated with each probable component fault based on information provided by the user.

In another aspect of the present invention, a method of diagnosing a vehicle fault is provided which includes the steps of receiving information on a vehicle from a customer regarding a vehicle fault and accessing data regarding the vehicle fault from the vehicle. A diagnostic program is initiated based on identifying vehicle information, the information received from the customer, and the data accessed from the vehicle. A specific vehicle system is selected for diagnosis and includes one particular vehicle component that may be associated with the vehicle fault. A list of diagnostic program results is received that define multiple probable vehicle component faults for the specific vehicle system that may be associated with the vehicle fault. A determination on how to proceed with correcting the vehicle fault is made based on the list of diagnostic program results that define multiple probable vehicle component faults. One particular vehicle component fault is selected from the list of multiple probable vehicle component faults to evaluate whether the one particular vehicle component is the source of the vehicle fault.

In yet another aspect of the present invention, a method of diagnosing a vehicle fault includes obtaining vehicle system data from a vehicle data information system on a vehicle and obtaining vehicle fault information from the customer. The customer information and the vehicle data information are interpreted and a determination is made as to whether a diagnostic process fault can be readily detected. A system diagnostic program is implemented and a diagnostic program is initiated based on the vehicle information, the data obtained from the vehicle, and the information obtained from the customer. Prioritized diagnosis output is received in the form of a list for a vehicle system program. The list is organized by likelihood of fault. A vehicle component fault is selected and is evaluated for performance based on the prioritized diagnosis options. The vehicle system associated with the vehicle component fault is validated to determine if it is not functioning properly, and the vehicle component fault is corrected if the vehicle system associated with the vehicle component fault is not functioning properly.

The present invention advantageously provides a low-cost and easy-to-use vehicle diagnosis system and method for determining one or more faults in a vehicle. The system and method advantageously identify symptoms following a diagnostic path that ultimately determines the source of the fault and instructions on how to repair or replace the component associated with the vehicle fault. Accordingly, the present invention eliminates or reduces the need for tedious and time-consuming testing, thus making the diagnostic aid more cost-efficient than conventional systems and methods.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
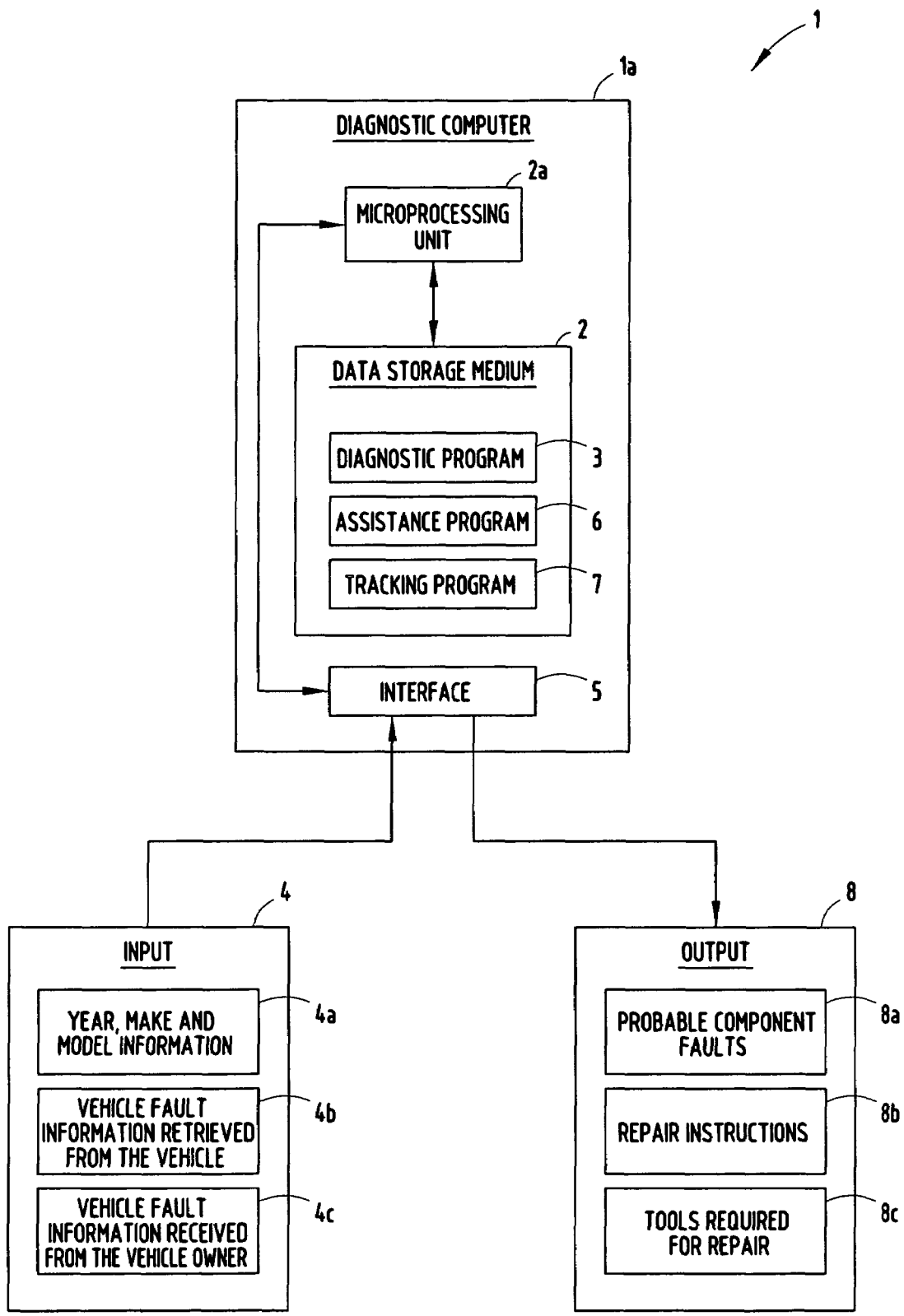
FIG. 1 is a flow diagram illustrating an overview of a vehicle diagnostic system.

Referring to FIG. 1, the reference numeral 1 generally designates a vehicle diagnostic system 1 that includes a diagnostic computer 1a having a data storage medium 2 linked to a microprocessing unit 2a that includes a sortable list of probable component faults for various vehicle systems of multiple vehicles organized by vehicle year, make, and model, according to one embodiment. The data storage medium 2 includes a diagnostic program 3 stored therein and executed by the microprocessing unit 2a to generate probable component faults from input 4 that includes year, make, and model information 4a. Other information may be inserted as input 4 including vehicle fault information that is retrieved from the vehicle 4b and vehicle fault information that is received from the vehicle owner 4c. The information is provided by a user/technician through an interface 5 that has data fields adapted to receive information from a user that relates to the input 4 (i.e., year, make, and model information 4a, the vehicle fault information retrieved from the vehicle 4b and the vehicle fault information received from the vehicle owner 4c). The data storage medium 2 also includes an assistance program 6 and a tracking program 7 stored therein and executed by the microprocessing unit 2a. The assistance program 6 allows information entered by a user to be observed by a third party for the purpose of assisting the user to diagnose a particular vehicle fault. In addition, the tracking program 7 updates the probability associated with each probable component fault based on information provided by the user. Finally, output 8 is provided that includes probable component faults 8a that may be the cause of the actual vehicle fault, instructions 8b on how to repair the probable component fault, and tools 8c that are required for the repair of the probable component fault. The update occurs every time a technician used the diagnostic system to determine the cause of an actual vehicle fault.

Figure 2:
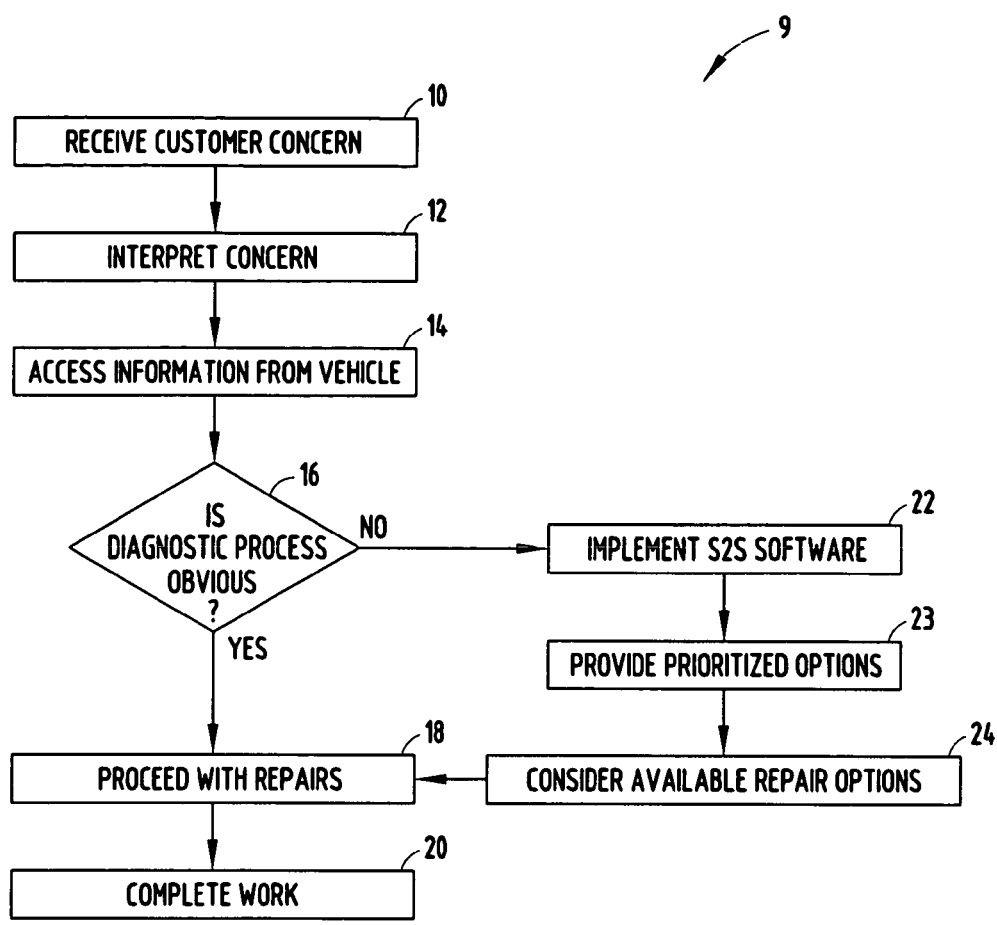
FIG. 2 is a flow diagram illustrating an overview of the diagnostic process for determining a vehicle fault according to one embodiment of the present invention.

Referring to FIG. 2, a method 9 for diagnosing a vehicle fault includes receiving a customer concern in step 10 regarding the vehicle fault. A user/technician is required to interpret the customer concern in step 12 and also access data in step 14 from the vehicle regarding the vehicle fault. If a diagnostic process is obvious as determined in decision step 16 and a repair can easily be made on a component, then the user may proceed with repairing the vehicle fault in step 18. If the diagnostic process is determined not to be obvious in step 16 in a vehicle system or component, and the fault is unknown, then S2S (symptom-to-system) diagnostic software may be implemented in step 22. The S2S software provides prioritized options in step 23 to the user so that the user may make a determination on how to proceed with repairing the vehicle fault. The available repair options are considered in step 24 by the user and the user proceeds to step 18, repairing the vehicle fault, depending on the various available repair options. Multiple systems or components may need to be analyzed. Finally, the component or system causing the fault is discovered and the fault causing component or system is replaced or repaired in step 20 using any known applicable repair procedure.

The S2S diagnostic software provides a multi-level search string from a list of predetermined choices. Although three to five levels in the search string are used in one embodiment, the S2S diagnostic software could have more or less search string levels depending on the system and its components. A user selects a different option at each level of the search string until a list of vehicle systems is provided that is reasonably associated with the symptoms the user is attempting to diagnose. The S2S diagnostic software also includes a permanent instruction panel that provides overview instructions for using the S2S diagnostic software. As a result of the user's selections at each level of the multi-level search string, the S2S diagnostic software provides a list of vehicle systems determined to be relevant to the symptom's description.

Figure 3:
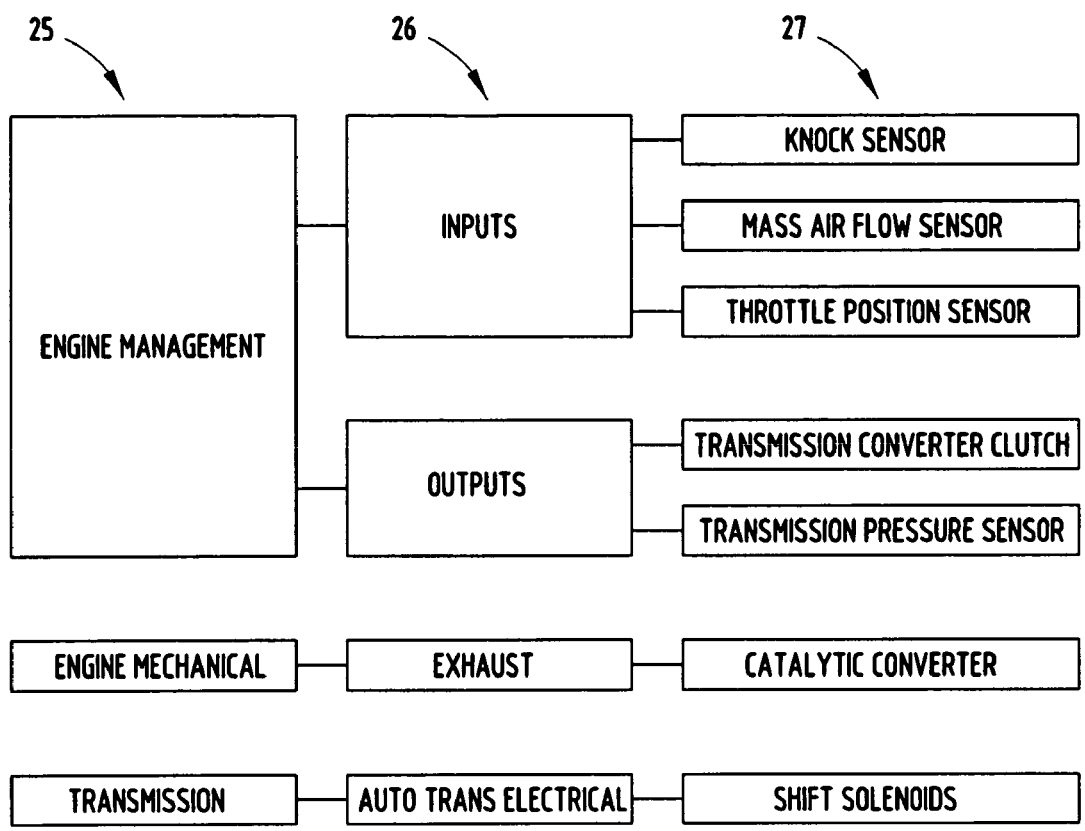
FIG. 3 is a block diagram illustrating an exemplary system list and its associated components.

Referring to FIG. 3, the architecture of an exemplary system list 25 is illustrated having main categories 26 and sub-categories 27. In this example, the system list 25 includes engine management, engine mechanical, and transmission. However, other vehicle systems may be included in the system list 25. The sub-categories 26 include inputs and outputs related to the engine management, and exhaust and auto trans electrical related to the engine mechanical and transmission, respectively. The sub-categories 27 are specific components related to the sub-categories 26 within the corresponding vehicle systems. The exemplary components shown include knock sensor, mass air flow sensor, throttle position sensor, transmission converter clutch, transmission pressure sensor, catalytic converter, and shift solenoids. It should be appreciated other sub-categories 26 and 27 may be employed in the system list 25.

The architecture of the system list 25 facilitates an understanding between the components of the system and assists the user in analyzing a proper diagnostic approach. Each vehicle component shown in sub-category 27 can be selected to provide an appropriate system overview. As components are selected, they are flagged or otherwise marked to indicate the system with which that component is associated has been checked. Multiple lists can be maintained at once and can be later identified by session identification (ID) information.

If a user recognizes a vehicle fault (problem) with a particular component without having to work through the multi-level search string, then the user can enter a diagnostic code identifying such fault. The S2S diagnostic software automatically provides search results based on the diagnostic code as if the user had made selections at each level of the multi-leveled search string. The results may be customized for every combination of diagnostic code and vehicle identification.

Figure 4A:
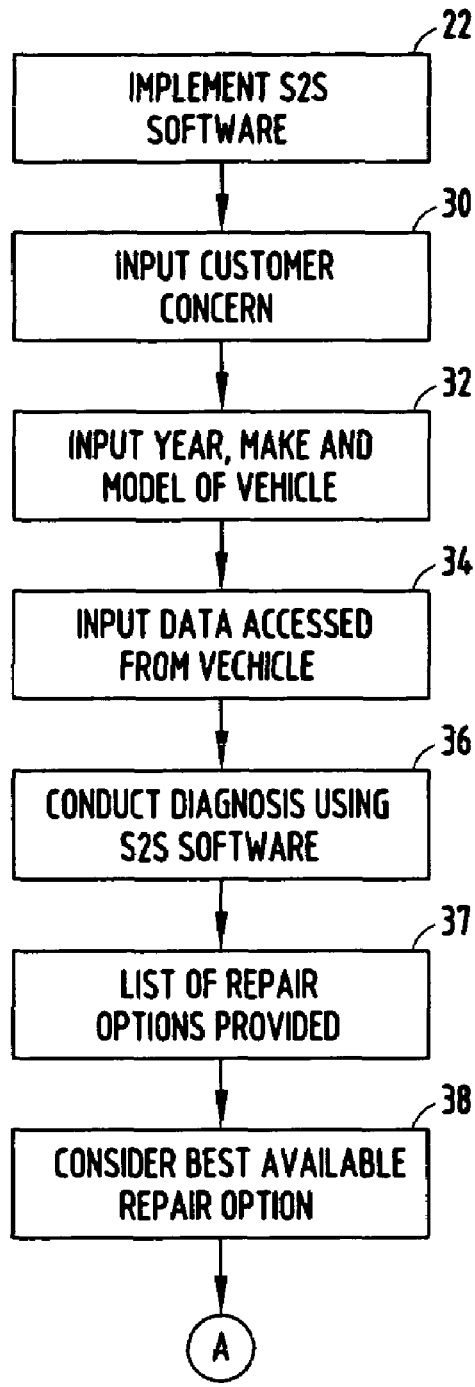
FIGS. 4A and 4B are flow diagrams further illustrating a method associated with the symptom-to-system diagnostic aid for diagnosing a vehicle fault according to the present invention.
Figure 4B:
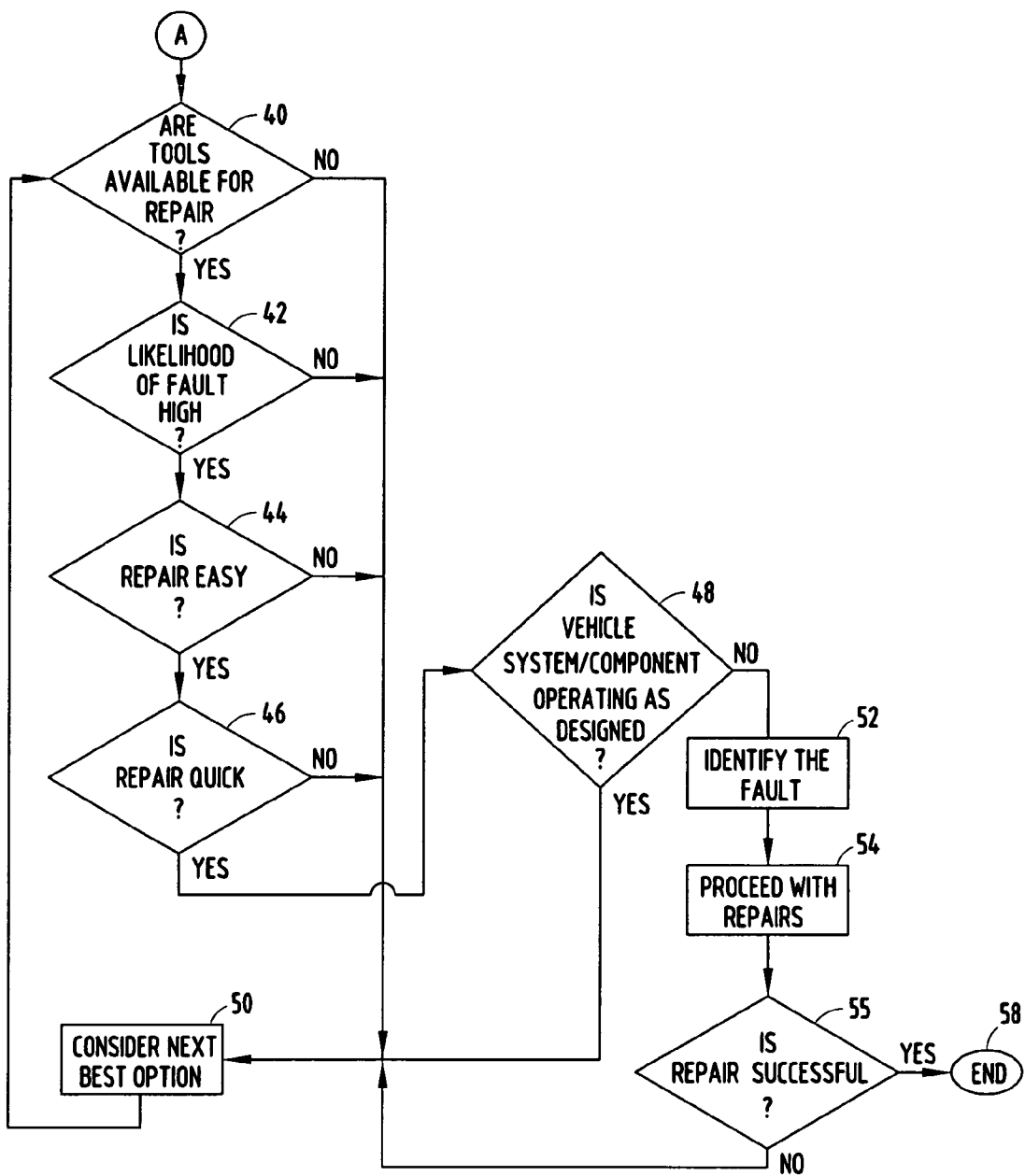

Referring to FIGS. 4A and 4B, a method 100 of diagnosing a vehicle fault using the S2S diagnostic software is illustrated in greater detail. Beginning at step 22, if the S2S diagnostic software is implemented, then the user may input customer concern information in step 30. The user also inputs vehicle year, make, and model information in step 32, as well as vehicle fault information provided by the vehicle in step 34. The S2S diagnostic software is then executed to conduct diagnosis in step 36 based on these factors and a list of repair options that are provided in step 37. The user then considers the best available repair option in step 38. Each repair option is associated with the repair or replacement of a particular vehicle component.

According to one embodiment, the user's consideration of the best available repair option in step 38 is based on the availability of tools for repair as determined in decision step 40, the likelihood that an option is the cause of the vehicle fault as determined in decision step 42, the ease in repair as determined in step 44, and the estimated repair time as determined in step 46 associated with a particular vehicle component. If each of these decision steps 40, 42, 44, and 46 are affirmative (yes) for a particular vehicle component, that is, there are tools available to repair the given component, the likelihood is high that replacement of a particular component will correct the fault, the component is easy to repair and quick to repair, then the vehicle system associated with the particular vehicle component is validated in step 48 to determine whether it is operating as designed. If any of decision steps 40, 42, 44, and 46 are negative (no), then method 100 proceeds to step 50 to consider the next best system before returning to step 40. Whether the vehicle system and the particular component are operating as designed is determined in decision step 48. If the component is operating as designed, then the next best option is considered in step 50 using the same analysis that was applied for the first repair option. If the vehicle system or component is not operating as designed, then the user may identify the fault in step 52 and proceed with repairs in step 54. Next, a determination as to whether the repairs have been successful is determined in decision step 55. If the repair is successful, then so ends the method 100 at step 58. If the repair is not successful 59, then the next best available option is considered in step 50.

Each time the S2S diagnostic software is implemented, the multi-level search string selections are recorded, and the last repair option that was considered by the user is also recorded. This information is used to update the probability that a particular system component is responsible for a detected system fault. Accordingly, the probability associated with vehicle faults continues to evolve as users continue to use the S2S diagnostic software in connection with method 100. In addition, to the extent that a user requires assistance in diagnosing a vehicle fault, a third party may be available via instant messaging, electronic mail, or telephone, to consult and provide S2S diagnostic software assistance. Furthermore, the user can insert diagnostic information including questions or concerns into a support queue that can be accessed by the third party. This assistance may be available at any time, and conveniently, the third party can view the diagnostic steps made by the user. The third party can essentially view the choices made at each level of the multi-level search string and the options that were presented for repair.

Data related to each probable vehicle fault includes instructions on how to correct a fault caused by at least one of the components. Additionally, testing methods, as well as appropriate tools necessary for component repair and/or replacement may be provided next to each search result.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A vehicle diagnosis system for determining one or more actual vehicle faults, said system comprising:
   a data storage medium having a sortable list of probable component faults for vehicle systems of multiple vehicles organized by vehicle year, make and model;
   a diagnostic program linked to the data storage medium that generates probable component faults from the sortable list based on a particular vehicle year, make and model;
   an interface having data fields adapted to receive information from a user that relates to fault information retrieved from a vehicle, vehicle fault information provided by a vehicle owner, as well as year, make and model information;
   data output including probable component faults, the best repair option based on the availability of tools for repair, the likelihood that an option is the cause of the vehicle fault, the ease of repair, and the estimated repair time;
   an assistance program that allows information entered by a user to be observed by a third party for the purpose of assisting the user to diagnose an actual vehicle fault; and
   a tracking program that updates the probability associated with each probable component fault based on information provided by the user.

2. The vehicle diagnosis system of claim 1, wherein:
   the data output includes instruction on how to correct at least one of the probable component faults.

3. The vehicle diagnosis system of claim 2, wherein:
   the data output is organized by the percent likelihood that a particular component fault is the source of the actual vehicle fault.

4. A method of diagnosing a vehicle fault comprising:
   receiving information on a vehicle from a customer regarding an actual vehicle fault;
   accessing data regarding the actual vehicle fault from the vehicle;
   initiating a diagnostic program based on identifying vehicle information, the information received from the customer, and the data accessed from the vehicle;
   selecting for diagnosis a specific vehicle system that includes at least one particular vehicle component that may be associated with the actual vehicle fault;
   receiving a list of diagnostic program results that define multiple probable vehicle component faults for the specific vehicle system that may be associated with the actual vehicle fault and which include data pertaining to the best repair option based on the availability of tools for repair, the likelihood that an option is the cause of the vehicle fault, the ease of repair, and the estimated repair time;
   making a determination on how to proceed with correcting the actual vehicle fault based on the list of diagnostic program results that define multiple probable vehicle component faults; and
   selecting one probable vehicle component fault from the list of diagnostic program results to evaluate whether the probable vehicle component is the source of the actual vehicle fault;
   uploading vehicle component fault information to the diagnostic program when an actual vehicle fault has been established;
   instructing the diagnostic program to recalculate the percent probability for each probable vehicle component fault; and
   providing an updated list of diagnostic program results based on the recalculated percent probability for each probable vehicle component fault for subsequent vehicle fault diagnosing operations.

5. The method of claim 4, further comprising the step of:
   validating that the one probable vehicle component fault in the vehicle system is the actual vehicle fault.

6. The method of claim 5, further comprising the step of:
   repairing the one probable vehicle component fault thereby correcting the actual vehicle fault.

7. The method of claim 4, wherein the step of selecting a specific vehicle system further comprises:
   establishing with a higher likelihood that the one probable vehicle component is the actual vehicle fault by selecting at least one symptom based on the specific vehicle system selected for diagnosis.

8. The method of claim 5, wherein the step of initiating the diagnostic program further comprises the step of:

initiating the diagnostic program based on year, make, and model information.

9. The method of claim 4, further comprising the step of:
inserting diagnostic information into a support queue for assistance by a third party that can view the diagnostic information.

10. The method of claim 4, further comprising the step of: receiving repair instructions for the repair of one probable vehicle component fault.

11. The method of claim 10, wherein the step of receiving a list of diagnostic program results further comprises:
receiving test methods and a pre-calculated percent probability for each probable vehicle component fault in the list of diagnostic program results.

12. A method of diagnosing a vehicle fault comprising:
obtaining vehicle system data from a vehicle data information system on a vehicle;
obtaining vehicle fault information from the customer;
interpreting the customer information and the vehicle data information;
determining whether an actual vehicle fault can be readily detected;
implementing a system diagnostic program to determine the actual vehicle fault;
initiating the diagnostic program based on the vehicle information, the data obtained from the vehicle, and the information obtained from the customer;
receiving prioritized diagnosis output in the form of a list of probable component faults for a vehicle system program, wherein the list is organized by likelihood of fault and includes the best repair option based on the availability of tools for repair, the ease of repair, and the estimated repair time;
selecting one probable component fault to evaluate based on the prioritized diagnosis options;
validating that the vehicle system associated with the probable component fault that is being evaluated is not functioning properly;
correcting the vehicle component fault if the vehicle system associated with the vehicle component fault is not functioning properly;
uploading vehicle component fault information to the diagnostic program; and
updating the probability for each of the prioritized diagnosis options for subsequent vehicle fault diagnosing operations with the system diagnostic program.

13. The method of claim 12, wherein the step of initiating the diagnostic program further comprises the step of:
increasing the likelihood that the probable component fault is the actual vehicle fault by selecting at least one symptom based on the specific vehicle system selected for diagnosis.

14. The method of claim 13, wherein the step of receiving prioritized diagnosis options further comprises:
receiving instructions on how to repair the vehicle fault.

15. The method of claim 14, further comprising the step of:
inserting diagnostic information into a support queue for assistance by a third party that can view the diagnostic information from a remote location.

16. The method of claim 15, further comprising the step of:
providing an indicator that a probable component fault has already been validated.

17. The method of claim 12, further comprising the step of:
providing a diagnosis code for a suspected component fault and receiving instructions from the diagnostic program on how to repair the suspected component.

* * * * *